United States Patent
Blish et al.

(10) Patent No.: US 7,372,453 B2
(45) Date of Patent: May 13, 2008

(54) FOOT OPERATED COMPUTER MOUSE

(76) Inventors: Jacob Adam Blish, 3840 East Ave., Rochester, NY (US) 14618; Nelson Adrian Blish, 3840 East Ave., Rochester, NY (US) 14618; Lou Horvath, 15 Bordom Heights, Rochester, NY (US) 14610

( * ) Notice: Subject to any disclaimer, the term of this patent is extended or adjusted under 35 U.S.C. 154(b) by 296 days.

(21) Appl. No.: 10/346,274

(22) Filed: Jan. 17, 2003

(65) Prior Publication Data

US 2004/0140951 A1     Jul. 22, 2004

(51) Int. Cl.
G06F 3/033 (2006.01)
G06F 3/02 (2006.01)
G09G 5/08 (2006.01)
G09G 5/00 (2006.01)
G09B 21/00 (2006.01)
H03K 17/94 (2006.01)
H03M 11/00 (2006.01)

(52) U.S. Cl. .................. 345/163; 340/825.19; 341/21; 341/22; 345/172

(58) Field of Classification Search ........ 345/156–172, 345/184
See application file for complete search history.

(56) References Cited

U.S. PATENT DOCUMENTS

| | | | |
|---|---|---|---|
| 5,334,997 A * | 8/1994 | Scallon | 345/167 |
| 6,339,440 B1 * | 1/2002 | Becker et al. | 715/858 |
| 6,683,627 B1 * | 1/2004 | Ullmann et al. | 715/786 |
| 6,722,984 B1 * | 4/2004 | Sweeney et al. | 341/176 |
| 6,788,284 B1 * | 9/2004 | Culler | 345/156 |
| 2002/0180695 A1 * | 12/2002 | Lawrence et al. | 345/156 |
| 2003/0006961 A1 * | 1/2003 | Shipilevsky | 345/157 |
| 2003/0137436 A1 * | 7/2003 | Foong | 341/21 |
| 2003/0214483 A1 * | 11/2003 | Hammer et al. | 345/163 |

OTHER PUBLICATIONS

Microsoft Windows; Microsoft Windows 98 Keyboard Guide; Jul. 7, 1998; p. 21-22 http://www.microsoft.com/enable/download/products/windows/win98key/w98_kbd.txt.*

* cited by examiner

*Primary Examiner*—Sumati Lefkowitz
*Assistant Examiner*—Alexander S. Beck
(74) *Attorney, Agent, or Firm*—Nelson Adrian Blish

(57) ABSTRACT

A computer cursor control system (10) including a foot operated cursor control device (16) connected to a Central Processing Unit (CPU) (12). The cursor (20) is positioned by the operator (18) by depressing a left pedal (24), a right pedal (26), or both. Reverse movement is provided using a left or right reverse button (28, 30) on a keyboard (22). Response sensitivity of cursor (20) movement is provided in a control window (40), with individual left and right pedal controls (42 and 44).

2 Claims, 3 Drawing Sheets

FOOT OPERATED COMPUTER MOUSE

FIELD OF THE INVENTION

This invention relates to computer peripheral devices, and more particularly to an improved foot operated device for controlling a position of a cursor for providing an input to the computer.

BACKGROUND OF THE INVENTION

Modern computers typically employ hardware and software to control a computer cursor, which in turn controls some computer functions. A cursor control device is commonly referred to as a mouse. Most computer manufacturers provide an interface in their equipment for connection to a mouse, and the cursor control for the mouse is commonly provided by software applications. For example, a mouse is used for cursor control applications in icon-based software of any kind, and is extensively utilized in computer controlled graphics applications.

Typically, a mouse is located and used in the vicinity of the computer. Most commonly, the mouse is supported on the same horizontal surface which supports the computer, and a pad is often positioned between the support surface and the mouse for preventing slippage of its internal track ball mechanism during movement of the mouse. Alternatively, the mouse can be supported by a specialized pull-out shelf mounted below the computer mounting surface. In either event, the mouse is operated by the user's hand by moving the mouse in a desired direction on the surface supporting the mouse, to control the position of the computer's cursor. This requires the operator to remove his or her hand from the computer's keyboard whenever it is desired to change the position of the cursor. When the cursor has been positioned as desired the operator returns his or her hand to the keyboard to resume operation of the computer.

The operator's hand movements away from the keyboard to the mouse, and back to the keyboard from the mouse, involve a certain amount of time and disruption in operation of the computer. In addition, repetitive hand and wrist movements often lead to a condition known as carpal tunnel syndrome.

Recognizing these drawbacks of conventional computer mouse deployment and use, a number of alternative foot-operated cursor control solutions have been proposed. For example, U.S. Pat. No. 5,886,685 (Best) discloses an adaptor that is worn on the operator's foot and fits over a conventional mouse. U.S. Pat. No. 5,907,318 (Medina), U.S. Pat. No. 5,334,997 (Scallon), and U.S. Pat. No. 5,745,055 (Redlich et al.) disclose various embodiments of a foot-controlled mouse based on a trackball mechanism. U.S. Pat. No. 5,838,305 (Bookstein) discloses a foot-operated cursor control in a mechanical arrangement using rails. U.S. Pat. No. 6,091,402 (Howell) discloses a number of foot-control methods, including use of a touchpad placed at the operator's feet. U.S. Pat. No. 5,841,426 (Dodson et al.) and U.S. Pat. No. 5,751,274 (Davis) both describe alternative foot-operated cursor control devices using trackball and joystick mechanisms.

Foot pedals have been used for command entry control with computers, largely for simulation systems. For example, foot pedals are connected to systems for driving or flight simulation in apparatus disclosed in U.S. Pat. No. 5,552,807 (Hayes et al.), U.S. Pat. No. 5,148,152 (Stueckle et al.) and U.S. Pat. No. 5,177,473 (Drysdale). However, these uses of foot pedal mechanisms have been directed to simulating controls for acceleration, braking, or aircraft rudder operation, rather than for mouse cursor positioning.

It can be seen, then, that many types of solutions have been proposed for providing the option of operator foot control for cursor positioning. However, this cursor positioning operation is only one function performed by the manual mouse. As is well known, the mouse is also used for selection and command entry, using one or more mouse buttons. Moreover, the type of manual action required for clicking the select buttons on the mouse demands a high degree of precision and can be more stressful than the requirements for keyboard entry of text. While most of the above-mentioned disclosures provide some type of click buttons as a substitute for the conventional mouse buttons, the solutions proposed are less than optimal. One characteristic type of solution that has been proposed is the deployment of buttons on the side or edges of the foot-operated mechanism, as in the U.S. Pat. No. 5,841,426 (Dodson et al.), U.S. Pat. No. 5,334,997 (Scallon), and U.S. Pat. No. 6,091,402 (Howell) disclosures. Alternatives include depressing the same device used for cursor control movement, seemingly an awkward arrangement and likely to result in unintended cursor movement unless done with precision, disclosed in U.S. Pat. No. 5,907,318 (Medina) and U.S. Pat. No. 5,751,274 (Davis).

Overall, then, while there have been some workable solutions proposed for replacing the mouse as a cursor movement tool, other mouse functions have not been addressed nearly as well. Some of the difficulties faced in replacing the manual mouse with a foot-operated device relate to the relative "dexterity" of the foot, that is to adeptness and precision of foot movement. While it is true that we use our feet for some types of complex operations where subtle movements are needed, such as when controlling vehicle acceleration and braking in traffic, there is little doubt that positional movement exercised for the foot differs substantially from that exercised for the hand. There is reason to suppose that the general arcwise movement sequence of pivoting the foot on the heel, familiar to anyone who drives an automobile, is suitable for control of incremental movement. However, movement of the foot in a cross-wise direction may not be nearly as precise. Thus, following the manual mouse analogy too closely may not result in a satisfactory foot control as a substitute for mouse functions.

A second consideration relates to clicking and double-clicking mouse buttons. While this operation can be readily performed by hand, there is reason to doubt that this same type of rapid tapping movement required would be easily performed by the feet. As is noted above, this is further complicated by the need to use the foot or feet for cursor positioning at the same time. This conflict may argue for a clear separation of positioning and clicking functions. In this spirit, the foot-control solution disclosed in U.S. Pat. No. 5,635,957 (Feierbach et al.) forgoes the use of the feet for mouse positioning and only uses feet for controlling the mouse click buttons. However, with such a solution, the operator is not freed from the requirement to regularly to remove and return her hand to the keyboard for cursor positioning.

In summary, while prior art solutions address some of the requirements for relieving the operator of constantly leaving and returning to the keyboard with the mouse-operating hand, there has been a lack of attention paid to the full scope of the problem and to what may be natural for an operator. More specifically, solutions for cursor positioning appear, in many cases, to simply substitute mechanical structures that had been employed for manual mouse movement and transplant them from the desktop to the floor, regardless of their suitability to the foot movement of the human operator. Solutions for selection buttons have continued in this same vein, regardless of the awkwardness of operation and of the relative discomfort that can be the result of the unnatural operator movement that would be required. A host of control functions that would ease foot-controlled cursor operation, or make it even feasible in some cases, have been overlooked.

Thus, it is an object of the present invention to provide a device for simplifying positioning of the computer cursor, or providing any other input to the computer, without requiring the operator to remove his or her hands from the keyboard. It is a further object of the invention to provide a device which prevents disruption in operation of the computer when it is desired to provide an input to the computer, such as to change the position of the computers cursor. It is a further object of the invention to provide a unique method of controlling the position of a computer cursor, to simplify operation of the computer, and to make computer operation more efficient. Yet another object of the invention is to ameliorate carpal tunnel syndrome in computer users.

SUMMARY OF THE INVENTION

It is an object of the present invention to provide an improved foot-operated cursor control for a computer with a computer cursor control system comprising:
- a central processing unit (CPU);
- a monitor connected to said CPU;
- a movable cursor displayed on said monitor;
- a keyboard connected to said CPU; and
- a foot operated cursor control device connected to said CPU, the foot operated cursor control device comprising a first pedal for controlling vertical movement of said cursor and a second pedal for controlling horizontal movement of said cursor.

It is a feature of the present invention that it combines foot-operated cursor positioning with keyboard controls for providing other mouse-related selection functions.

It is an advantage of the present invention that it allows an operator to perform mouse related functions without the distraction and wasted movement required to move the hand from the keyboard to the mouse and back again. The present invention provides a way to allow the operator to maintain hand position on the keyboard while manipulating cursor position using one or both feet.

It is a further advantage of the present invention that it provides sensitivity control settings, allowing adjustment of cursor movement to suit the abilities and coordination of an individual operator as well as the environment of a software program or game.

The invention and further objects and advantages will become more apparent in the detailed description of the preferred embodiment presented below.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 1b is an enlarged perspective view of the keyboard shown in FIG. 1a.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1A:
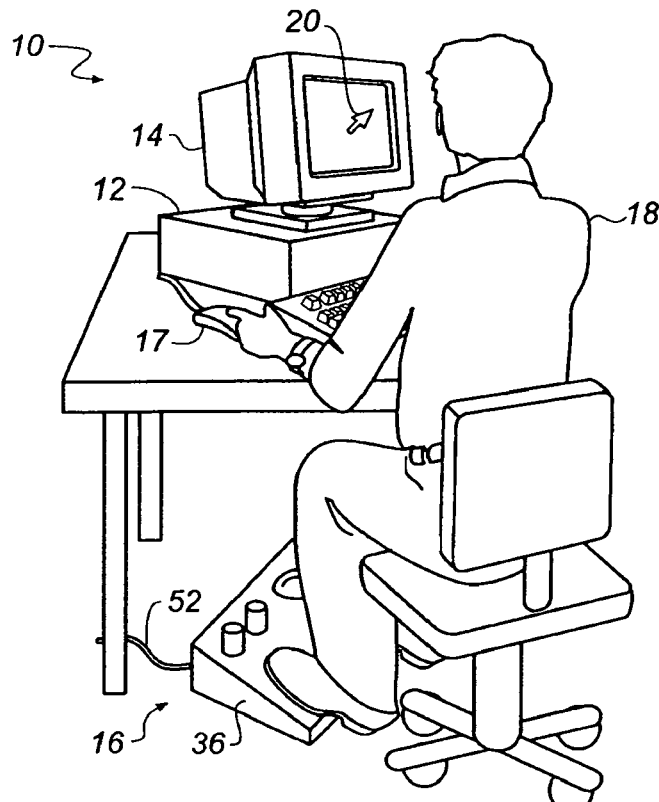
FIG. 1a is a perspective view showing a computer apparatus having a foot-operated cursor control, with accompanying keyboard controls according to the present invention.
Figure 1B:
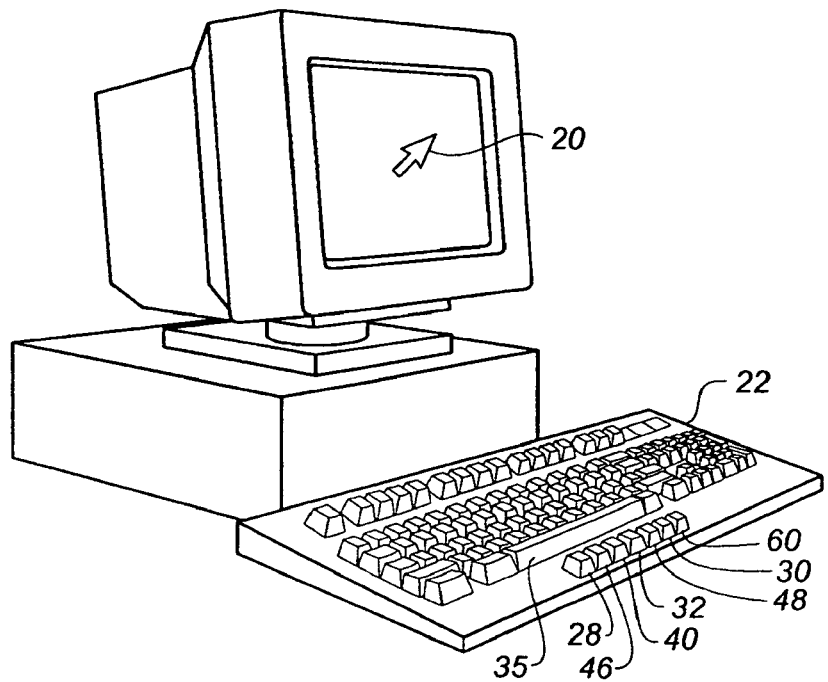

Referring now to FIGS. 1a and 1b, a computer cursor control system, referred to in general by 10, is shown. The major components of the computer cursor control system include a central processing unit (CPU) 12, a monitor 14 connected to the CPU 12, and a foot operated cursor control device 16 connected to the CPU by a wire 52.

CPU 12, often referred to as a computer, may be manufactured by any of a number of companies including IBM, Dell, Hewlett-Packard, or Apple Computer. CPU 12 may contain one or more microprocessors, manufactured by companies such as Intel, Apple, Motorola, or other companies. Typical operating systems used by modern CPUs include Microsoft Windows, Linux, and OS X, for example. A keyboard 22 is connected to CPU 12 for accepting commands and text entry from an operator 18.

A cursor 20, controlled by CPU 12 according to positioning commands from operator 18 is displayed on monitor 14. In a manner familiar to those who work with conventional desktop computers, cursor 20 acts as an electronic pointer, whether to text, icons, menus, or other objects on the display of monitor 14. Positioning control of cursor 20 is performed in response to manipulation of foot-operated cursor control device 16 by operator 18. Various foot operated control devices according to the present invention are shown in FIGS. 2-6, described in more detail below.

Figure 2:
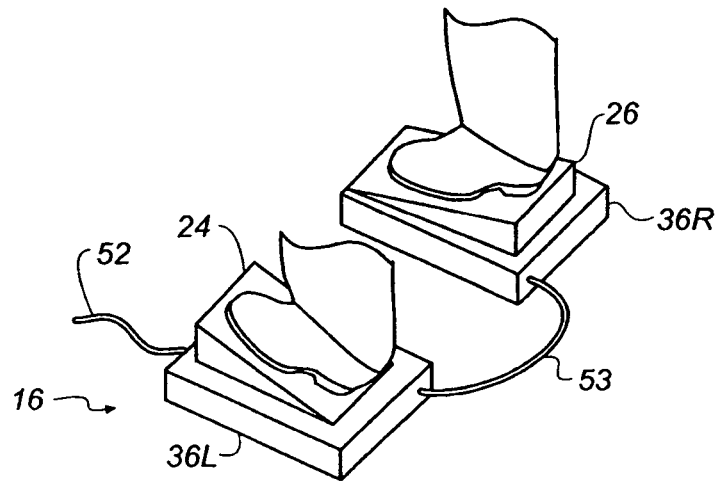
FIG. 2 is a perspective view showing a foot-operated cursor control according to the present invention.

In a preferred embodiment, shown in FIG. 2, foot-operated cursor control device 16 is mounted within platforms 36l, 36r. A left pedal 24 for controlling movement of cursor 20 in the horizontal direction and a right pedal 26 for controlling movement of cursor 20 in the vertical direction. Left and right pedals 24 and 26 operate conventionally in a manner somewhat analogous to the operation of the accelerator pedal in an automobile. That is, depressing left or right pedal 24 or 26 moves cursor 20 in the appropriate direction at a rate that is a function of the amount of force exerted by operator 18. This embodiment is referred to in general as "velocity positioning," wherein the speed the cursor moves is dependent on the distance the pedal is depressed. The cursor continues moving until the pedal is returned to an at rest position.

Figure 7:
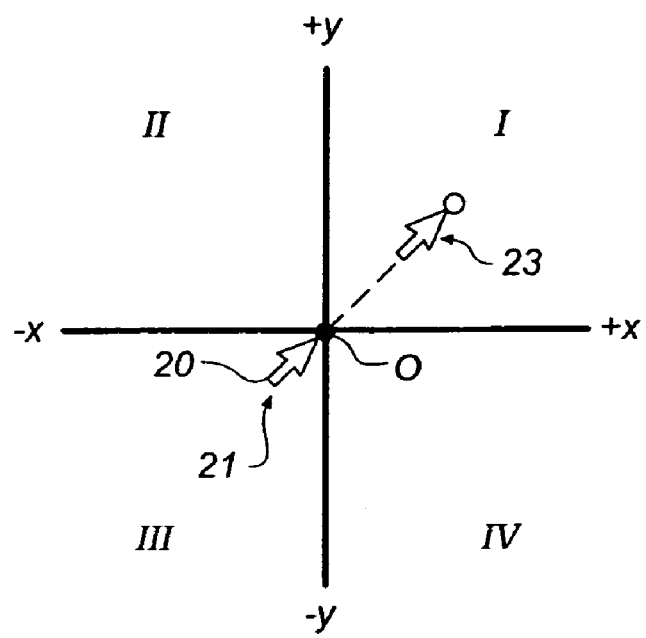
FIG. 7 is a plane view showing a coordinate system for cursor control when using the apparatus of the present invention; and, FIG. 8 is a plane view showing a control window for making foot control settings to suit an individual operator.

Referring to FIG. 7, there is shown a graphical representation of cursor 20 movement in x (horizontal) and y (vertical) directions. Following conventional Cartesian axes and polarity assignments, FIG. 7 shows how cursor 20 can be moved from an original position 21 to a position in one of four quadrants, numbered I, II, III, or IV. Movement from original position 21 into quadrant I requires positive movement in both x (horizontal) and y (vertical) directions, allowing cursor 20 to reach a new position, indicated as cursor 23 in FIG. 7.

In an alternate embodiment, the cursor 20 moves a distance on screen proportional to the displacement of the pedals 24, 26. In other words, depressing either of the pedals an amount A displaces the cursor a distance B. This is similar to the operation of a hand operated mouse. When the pedal stops moving, the cursor stops moving. This embodiment is referred to in general as "distance positioning."

Manual Control Keys

By default, depressing left pedal 24 or right pedal 26 causes movement of cursor 20 in a positive direction, that is, into quadrant I. For movement into any of the other quadrants (II, III, or IV), however, one or both directions must be negative (that is, either x or y). To provide movement in the negative direction, left and right reverse buttons 28 and 30 are provided on keyboard 22. Left reverse button 28 works in conjunction with left pedal 24. Right reverse button 30 works in conjunction with right pedal 28.

In the velocity positioning embodiment, for example, when operator 18 depresses left reverse button 28 on keyboard 22 and presses down on left pedal 26, cursor 20 moves horizontally in the (−x) direction, using the mapping of FIG. 7. In this way, although cursor 20 movement requires some keyboard action along with foot action by operator 18, there is no need for operator 18 to remove either hand from keyboard 22 in order to effect cursor repositioning. Instead, simply depressing left or right reverse buttons 28 or 30 enables reversal of cursor 20 movement direction.

In the distance positioning embodiment, when operator 18 depresses left reverse button 28 on keyboard 22 and presses down on left pedal 26, meaning the toe end the pedal moves downward, cursor 20 moves horizontally in the (−x) direction, using the mapping of FIG. 7. This feature is also useful when the pedal reaches the full extent of travel. Cursor movement continues in the same direction after the reverse button is pressed, even though the foot pedal is moved in an opposite direction.

In a preferred embodiment, left and right reverse buttons 28 and 30 are separate controls provided on keyboard 22. Alternately, commands for cursor movement can utilize keyboard key sequences, such as conventional keying sequences entered by holding down one or more control keys such as <ALT> or <CONTROL>, while depressing another key momentarily. In yet another embodiment, "function" keys may be programmed to perform these actions. In addition to control of the movement direction of cursor 20, other controls are provided for cursor 20 with foot operated cursor control device 16.

A reversion or reset control key 32 provides a reset of cursor 20 position to a "home" location 0, shown in FIG. 7. Home location may be at the center of the display screen, as shown in FIG. 1b, or may be at some other suitable location, such as top, bottom, or corner, for example. By resetting cursor 20 position with a single keystroke, operator 18 can continue movement in a single direction without the need for more complex hand-foot interaction.

The reset key 32 may be use to program the cursor to move to various frequently used locations on the monitor screen. For example, cursor 20 may be moved to the lower portion of monitor screen over the "Start" tab. Simultaneously depressing <CONTROL>, reset key 32, and numeric key <6>, programs that location into CPU memory. Later, when the operator 18 desires to move cursor 20 from some location to the Start tab, she simultaneously presses the reset key 32 and the numeric key <6>, which rapidly moves the cursor to that location. Other combinations of keys may be used to program the reset key 32, for example the <ALT> key.

In a further embodiment, reset key 32 moves cursor 20 to the last at rest position. Depressing the reset key 32 again moves the cursor 20 to the next to last at rest position. This may prove useful when a number of repetitive cursor operations, such as drag and drop evolutions, which require repeatedly positioning the cursor to the same on screen position, are required. Repositioning the cursor with a single keystroke will save operator time, rather than moving the cursor with foot pedals or with the hand operated mouse 17.

Figure 8:
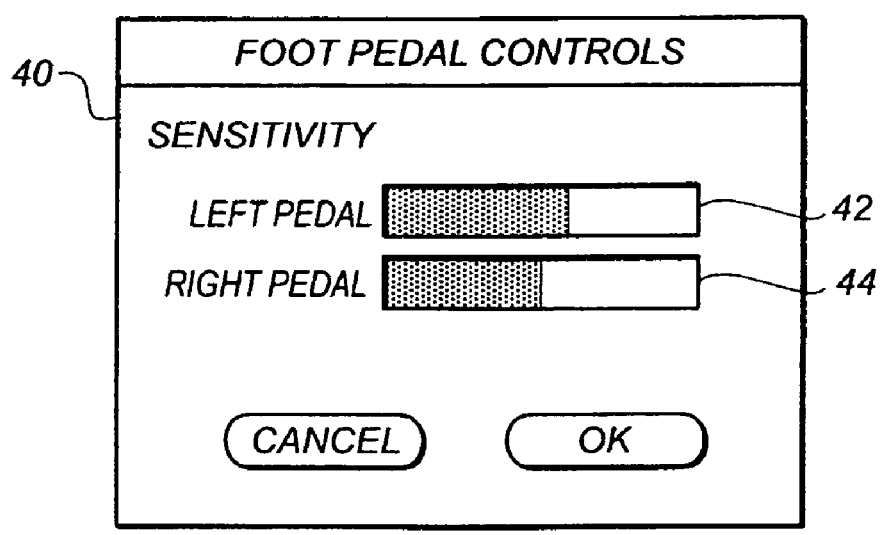

Another requirement for workable control of cursor 20 movement is a response sensitivity setting. CPU 12 provides sensitivity control that effectively sets the "resolution" of left and right pedals 24 and 26. There may be a need to move cursor 20 very quickly, for example, when paging through a lengthy document displayed on monitor 14, or very slowly, when, for example, working on a drawing. In a preferred embodiment, a separate setting is made for pedal sensitivity for each pedal 24 and 26. As shown in FIG. 8, a control window 40, accessible using a standard command sequence such as using the familiar "Settings→Control Panel" provided for Windows-based computer systems, provides a left pedal control 42 and a right pedal control 44. This allows operator 18 to set sensitivity to suit individual needs and adeptness, recognizing that operator 18 may have different levels of coordination between left and right foot movement. As with similar types of control settings, operator 18 typically sets and adjusts the settings in control window 40 as needed, including changing these settings to suit different programs or games, for example.

Optionally, as shown in FIG. 1, a position/velocity control button 40 on keyboard 22 can be depressed, singly or in combination with other control keys, to adjust the relative sensitivity of response to left and right pedals 24 and 26. In the distance positioning embodiment, adjusting the relative sensitivity, adjusts the distance the cursor travels with respect to the distance the foot pedal is moved. In the velocity positioning embodiment, adjusting the relative sensitivity, adjusts the speed at which the cursor travels with respect to the distance the foot pedal is moved.

In a preferred embodiment, keyboard 22, as shown in FIG. 1b, also includes a left click button 46 and a right click button 48, allowing operator 18 to have manual control over these additional mouse functions directly from the keyboard. Putting the left click and right click buttons on the keyboard is an additional way for the operator to keep her hands on the keyboard and speed operations. As an alternative, one or more click buttons 50 could be provided on platform 36 as is shown in the alternate embodiment of FIGS. 3,4 and 6.

A pause control key 60 is also provided on keyboard 22. By depressing pause control key 60, operator 18 can temporarily disable foot operated cursor control device 16, such as when operator 18 wishes to adjust foot position or perform some other control or command or text entry function on keyboard 22. The pause key 60 may also be used in the distance positioning embodiment to relocate the foot pedal position without moving the cursor when the foot pedal reaches a full extent of travel position. This would be an alternative to using the reverse keys.

The various cursor control keys are shown as located below "space bar" 35. This is a convenient location, since the operator can easily operate the various cursor control keys with her thumbs. These keys include, but are not limited to: left click, right click, left reverse, right reverse, reset, position/velocity control, and pause keys, all of which have been discussed above. Alternatively, these keys may be located to the left, right, or above the conventional alphanumeric keys.

The additional control functions provided for foot operated cursor control device 16 by the present invention adapt the use of one or both feet by operator 18 to the task of performing mouse-related functions. By adjusting sensitivity, providing cursor reset and reverse functions, and allowing a temporary pause to foot operated cursor control device 16 operation, these added controls help to make cursor control and mouse click functions more practical for operator 18. These operations provide a substitute for conventional mouse control input, and may alleviate symptoms of carpal tunnel syndrome. The present invention may also be used in conjunction with, rather than in place of the conventional hand operated mouse.

Figure 3:
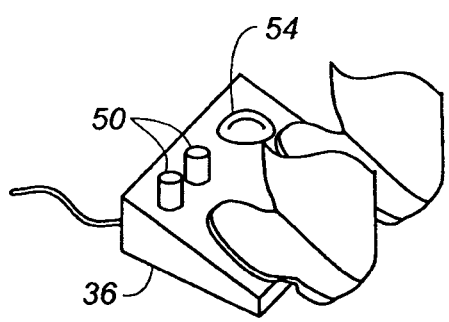
FIG. 3 is a perspective view showing an alternative foot-operated cursor control apparatus.
Figure 4:
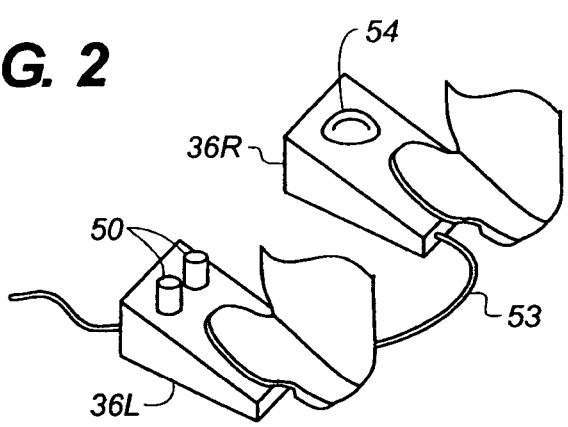
FIG. 4 is a perspective view showing another embodiment of the apparatus of FIG. 3.
Figure 6:
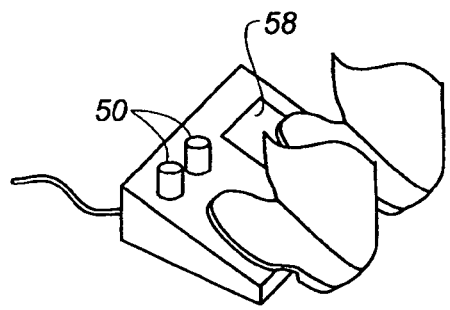
FIG. 6 is a perspective view showing yet another alternate embodiment of the present invention.

Referring to FIGS. 2, 3, 4, 5, and 6, there are shown alternative arrangements of foot operated cursor control device 16 and platform 36. FIG. 2 shows an embodiment in which left pedal 24 is mounted within a left platform 36*l* and right pedal 36 is mounted within a right platform 36*r*, with wire 53 connecting left and right platforms 36*l* and 36*r*. The platform may be one piece as shown in FIGS. 3 and 6, or two pieces, as shown in FIGS. 2 and 4.

Figure 5:
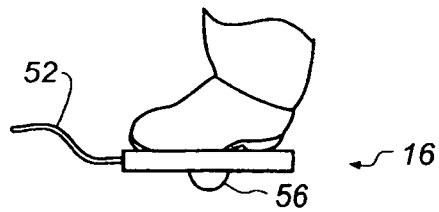
FIG. 5 is a side view of another alternative foot-operated cursor device.

FIGS. 3 and 4 show embodiments of foot operated cursor control device 16 using a track ball 54 and one or more separate click buttons 50. FIG. 5 shows yet another alternate embodiment wherein a roller ball 56 is mounted at the base of foot operated cursor control device 16. FIG. 6 shows yet another alternate embodiment wherein a touch screen 58 is used for cursor 20 positioning with one foot, while buttons 50 are provided for actuation by the other foot.

The invention has been described in detail with particular reference to certain preferred embodiments thereof, but it will be understood that variations and modifications can be effected within the scope of the invention. For example, operator 18 may have the option of selecting use of click buttons 50 on foot operated cursor control device 16 or of left and right click buttons 46 and 48 on keyboard 22. Additional reset control keys 32 can be provided to allow fast repositioning of cursor 20 to other points on the display screen. Optionally, reset control key 32 can be programmed to allow stepping back through an ordered set of previous positions of cursor 20. Foot operated cursor control device 16 need not be connected to CPU 12 by wire 52; a wireless connection could be provided 30 using an electromagnetic signal, such as an RF frequency or light.

Thus, what is provided is an improved foot operated device for controlling a position of a cursor for providing an input to the computer.

| PARTS LIST | |
|---|---|
| 10 | Computer cursor control system |
| 12 | Central processing unit (CPU) |
| 14 | Monitor |
| 16 | Foot operated cursor control device |
| 17 | Hand operated mouse |
| 18 | Operator |
| 20 | Cursor |
| 21 | First cursor position |
| 22 | Keyboard |
| 23 | Second cursor position |
| 24 | Left pedal |
| 26 | Right pedal |
| 28 | Left reverse button |
| 30 | Right reverse button |
| 32 | Reset control key |
| O | Home location |
| 35 | Space bar |
| 36 | Platform |
| 36l, 36r | Left platform, Right platform |
| 40 | Position/velocity key |
| 42 | Left pedal control |
| 44 | Right pedal control |
| 46 | Left click button |
| 48 | Right click button |
| 50 | Buttons |
| 52 | Wire |
| 54 | Track ball |
| 56 | Roller ball |
| 58 | Touch screen |
| 60 | Pause control key |

What is claimed is:

1. A computer cursor control system comprising:

a central processing unit (CPU);

a monitor connected to said CPU;

a movable cursor displayed on said monitor;

a keyboard connected to said CPU, wherein said keyboard comprises a first reverse key and a second reverse key to reverse cursor direction; and a foot operated cursor control device connected to said CPU, the foot operated cursor control device comprising a first pedal for controlling vertical movement of said cursor according to the setting of the first reverse key and a second pedal for controlling horizontal movement of said cursor according to the setting of the second reverse key, wherein when said first pedal reaches the physical limits of travel when pressed in a toe down manner before said cursor reaches the full extent of travel in the vertical direction, said cursor continues to travel in the vertical direction when said first pedal is pressed in a heel down manner and the first reverse key is pressed.

2. A method of controlling position of a cursor on a monitor connected with a computer, the method comprising:

depressing a first pedal in a toe down manner to move the cursor in a horizontal direction;

depressing a second pedal in a toe down manner to move the cursor in a vertical direction;

if the first pedal reaches the physical limits of travel when pressed in the toe down manner before the cursor reaches the full extent of travel in the horizontal direction, depressing a first control key on the keyboard to continue cursor movement in the horizontal direction when depressing the first pedal in a heel down manner; and if the second pedal reaches the physical limits of travel when pressed in the toe down manner before the cursor reaches the full extent of travel in the vertical direction, depressing a second control key on the keyboard to continue cursor movement in the vertical direction when depressing the second pedal in a heel down manner.

* * * * *